Sept. 26, 1961   W. P. O'BRIEN ET AL   3,001,326
CEMETERY VASE UNIT

Filed July 25, 1958   3 Sheets-Sheet 1

INVENTORS:
WILLIAM P. O'BRIEN
DANIEL BYRNE
BY Marshall, Johnston, Cook & Root
ATT'YS Sept. 26, 1961 W. P. O'BRIEN ET AL 3,001,326
CEMETERY VASE UNIT
Filed July 25, 1958 3 Sheets-Sheet 2

INVENTORS:
WILLIAM P. O'BRIEN
DANIEL BYRNE
BY Marzall, Johnston, Cook & Root
ATT'YS Sept. 26, 1961 W. P. O'BRIEN ET AL 3,001,326
CEMETERY VASE UNIT
Filed July 25, 1958 3 Sheets-Sheet 3
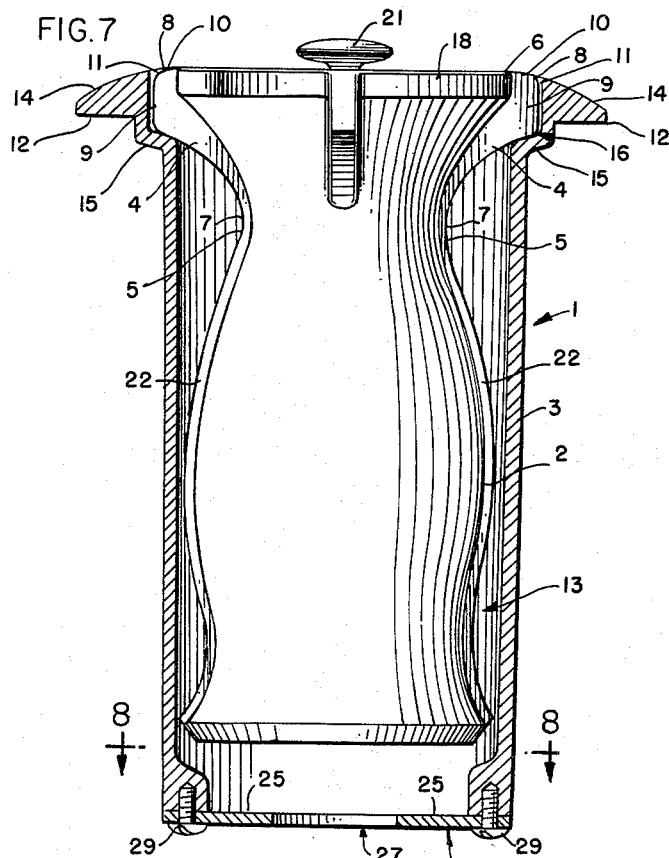
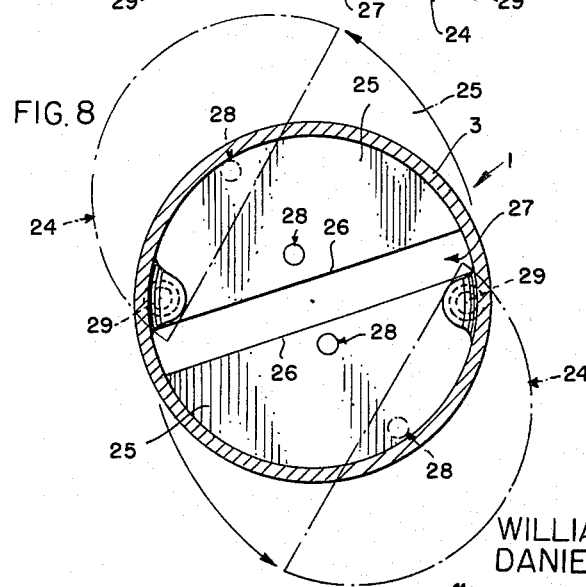
INVENTORS:
WILLIAM P. O'BRIEN
DANIEL BYRNE
BY *Marzall, Johnston, Cook & Root*
ATT'YS

United States Patent Office 3,001,326
Patented Sept. 26, 1961

3,001,326
CEMETERY VASE UNIT
William P. O'Brien, Western Springs, and Daniel Byrne, Elmhurst, Ill., assignors to W. D. Allen Manufacturing Co., Chicago, Ill., a corporation of Illinois
Filed July 25, 1958, Ser. No. 751,041
2 Claims. (Cl. 47—41)

This invention relates to a cemetery vase unit comprising a vase and a receptacle, the vase portion of the unit being mounted on top of the lower receptacle to receive cut flowers, and when not in such use, being received in the base portion or lower receptacle in an inverted position.

The cemetery vase unit of the invention has its supporting base part, or lower receptacle, buried into the ground to a point where an outstanding annular rim or flange is relatively flush with the surface of the ground. The base portion of the receptacle is provided with spaced apart notches into which legs or protuberances formed on the vase are adapted to be received to support the vase in normal upright flower receiving position. Internal, oppositely-disposed slots or notches are formed in the base receptacle, and legs or projections are received in the slots to support the vase in an upright position. The protuberances or legs on the bottom of the vase are such size and contour with respect to the slots in the receptacle that they fit easily and freely therein, and normally are prevented from falling over because of wind blowing against the flowers. They also permit the vase to be knocked off its lower receptacle should it be struck a sharp blow such as a lawn mower striking the vase proper. The legs at the lower end of the vase fit into the slots to hold the parts in assembled relation when the vase is in inverted position and lowered in the lower receptacle.

The vase may be connected to the lower receptacle by means of a chain or cable, a cable in the nature of twisted wire being specifically shown. While it is hard to conceive that anybody would steal the vase and its receptacle, the receptacle is provided with pivoted wings at its lower end which are adapted to be spread outwardly and pushed into the ground beyond the normal periphery of the base to make it virtually impossible to remove the receptacle. However, in cases where the unit is adapted to be removed for changes of graves, or other reasons, it may be done, perhaps with some effort, by swinging the wings inwardly and thus permitting the base and its attached vase to be removed.

The primary object of the present invention is the provision of cooperating legs on the vase at its normal base to be received in slots in the rim of the receptacle, normally to prevent the base from blowing over by gusts of wind, but still permitting the vase to fall over when it is struck by a blow such as by it being struck with a lawn mower.

Another object of the invention consists in the provision of a cemetery vase unit comprising a vase proper and a receptacle which receives the vase in inverted position, there being legs formed at the base of the vase of a particular contour and size to be received into slots in the rim of the lower receptacle of a particular contour and size so that the vase will fall over when struck a blow by a lawn mower, for instance, but will maintain the vase in normal upright position when there are flowers in the vase and there is a relatively high wind.

A further object of the invention consists in the new and novel arrangement, size and location of the parts to effect the proper operation of the vase and its cooperating base receptacle to allow the vase to remain in normal upright position even in windy weather and still cause the vase to tip and fall on the ground when the vase is given a sharp blow.

Still another object consists in new and novel means for preventing removal of the vase unit by connecting the two parts by a cable and by the application of certain pivoted elements normally arranged within the confines of the base and adapted to be spread outwardly and engage the ground beyond the outside of the receptacle to prevent the receptacle from being withdrawn easily from the earth.

Numerous other objects and advantages will be apparent throughout the progress of the specification which is to follow.

The accompanying drawings illustrate a certain selected embodiment of the invention, and the views therein are as follows.

FIG. 7 is a detail vertical sectional view showing the vase in its normal inverted position and arranged within the receptacle; and FIG. 8 is a detail transverse sectional view on the line 8—8 of FIG. 7 showing side wings relatively semicircular in shape, and spread outwardly for engagement with the ground to prevent removal of the receptacle unless superior force is provided to return the wings inwardly.

Figure 1:
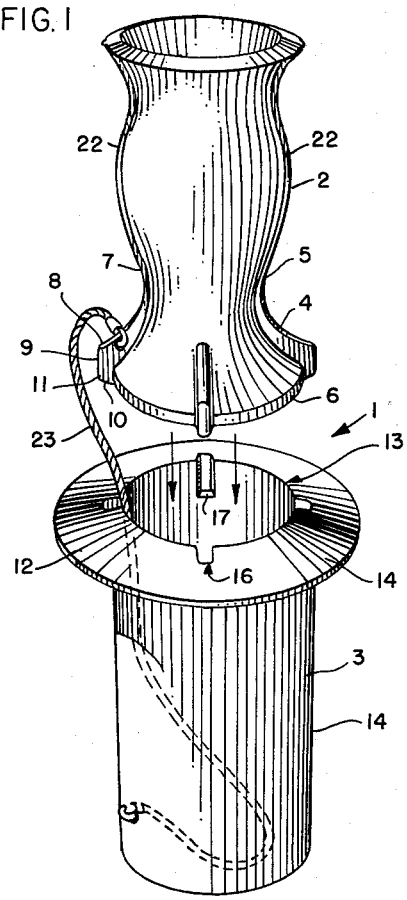
FIG. 1 is a detail perspective view of the unit showing the vase prior to being mounted on the base receptacle, the two parts being secured together by a cable of braided wire.
Figure 2:
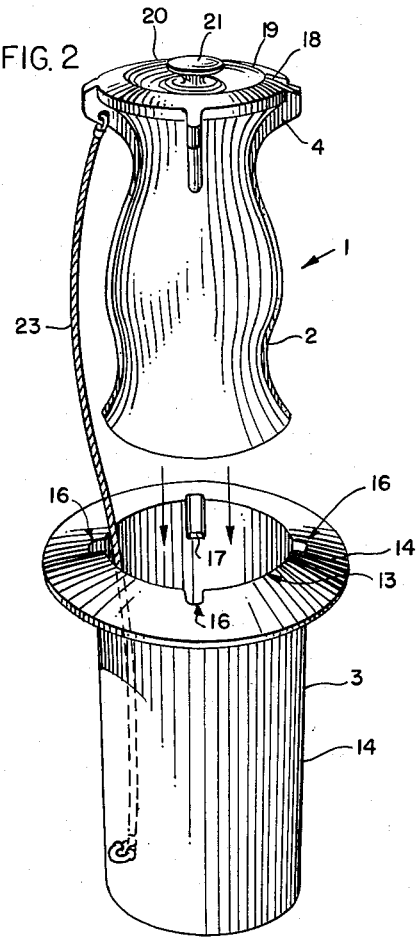
FIG. 2 is a view similar to FIG. 1, but showing the vase in inverted position prior to being received within the hollow base.
Figure 3:
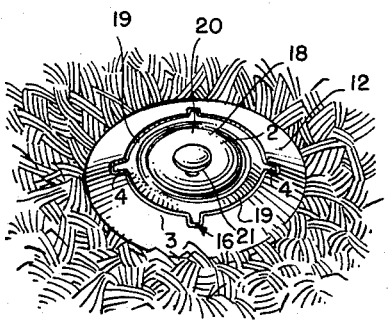
FIG. 3 is a detail perspective view showing the unit in its normal position when not in use, the top of the unit being flush, or relatively so, with respect to the ground.

The unit 1 comprises a vase 2 and a lower receptacle 3 into which receptacle the vase 2 is adapted to be received in inverted position, FIGS. 2, 3 and 7. The vase part 2 may comprise any particular formation, but is preferably of the ornamental form shown in FIGS. 1, 2 and 4 to 7.

The vase portion 2 is provided with outstanding legs or projections 4, there being four of such legs 4 specifically shown. The legs extend outwardly at a point near the base of the vase as shown at 5, and extend completely to the lower bottom 6 of the vase, being tapered outwardly from the point indicated at 7 to the point indicated at 8, whereupon they terminate relatively straight as indicated at 9 to their bottoms 10. The point between the side edges 9 and the bottom 10 is relatively rounded as indicated at 11, FIGS. 1 and 7.

The base or receptacle part 3 is tubular, being hollow throughout its entire length. The upper end of the receptacle 3 terminates into an annular flange 12 which completely encircles the receptacle opening 13. The flange 12 is relatively rounded or bowed radially at 14, as shown in the various figures, particularly FIG. 7, and is integral with the lower cylinder part 3. Protuberances or boss-like projections 15, FIG. 7, are arranged immediately below the rim or flange 12 and outside of the receptacle 3. The body of the receptacle 3, at the bosses 15, is milled or cut away to form diametrically opposed notches 16, there being one of such notches for each one of the legs 4.

The depth of the notches 16 is such that the bottom edge 10 of the legs 4 will rest on the material at the bottom of each notch, as indicated at 17, FIGS. 1 and 2.

Figure 5:
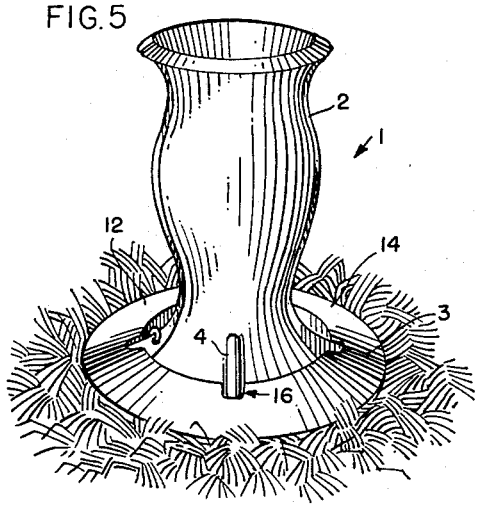
FIG. 5 is a detail perspective view of the vase in its normal engagement with the lower receptacle for flower receiving position, the lower receptacle being buried in the ground.

The notches 16 are also of a size, contour and configuration to normally hold the vase in its normal, upright, flower-holding position with the legs 4 in the notches 16, but, at the same time, will permit the device to tip when struck a sharp blow to be tilted angularly and to fall over onto the ground. However, the engagement of the legs 4 with the notches 16 is such that the legs will normally hold the vase in normal upright position, as shown in FIG. 5, when there are flowers in the vase and they are subjected to strong gusts of wind.

Figure 4:
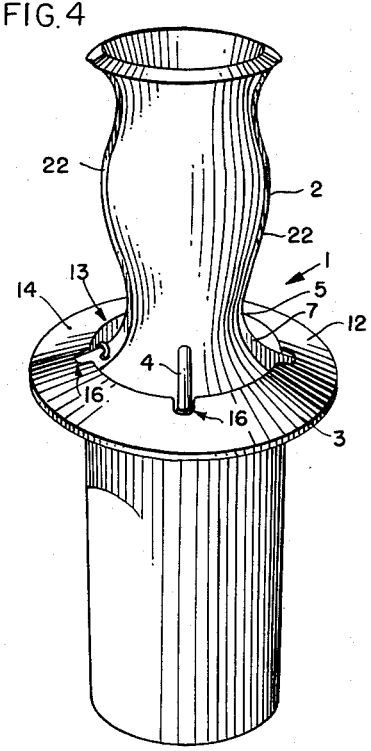
FIG. 4 is a detail perspective view of the vase mounted on the lower receptacle, the lower receptacle not being buried in the earth.
Figure 6:
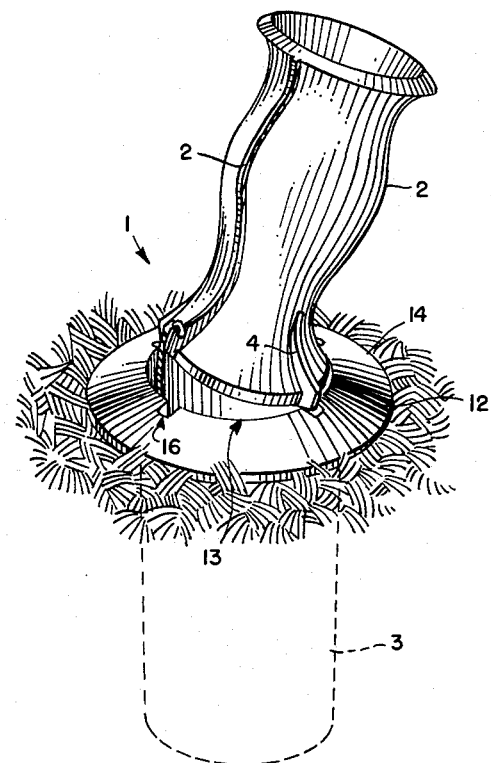
FIG. 6 is a detail perspective view showing the vase tipped with respect to its base to permit the vase to fall over onto the ground when the vase is struck by an object such as a lawn mower.

The vase 2 has its bottom, FIG. 2, closed by an annular plate 18 which is integral with the body of the vase 2, the bottom 18 including an outstanding peripheral or annular flange 19. This flange 19 is integral with the legs 4, but the legs 4 are arranged outwardly of the outer extremity of the flange 19 and facilitate in the holding operation of the vase on the receptacle, FIG. 5. The cut back at the ends of the legs 4 permits the tilting operation of the vase, as disclosed in FIG. 6. The legs 4 are integral with the flange 19 as well as with the body of the vase 2. The legs 4 of the vase extend downwardly from the point 7, and terminate at the points 8, 9 and 11, FIGS. 1 and 7. The annular rim of the flange 19 of the vase 2 is rolled or slightly curved radially to the point indicated generally by the numeral 20 where it curves downwardly and inwardly dish-shaped toward the central knob 21 which is integral with the base 18. The base 18 constitutes the bottom when the vase is in its normal flower-holding position, as shown in FIGS. 1, 4 and 5, but constitutes the top of the vase when the vase is in its inverted position, as shown in FIGS. 2, 3 and 7. The vase 2 may also be provided with upstanding ribs 22 on opposite sides thereof to lend strength and rigidity to the vase, as well as rendering the vase more ornamental.

Strange as it may seem, some of these units, including the vase and receptacle, mysteriously disappear, probably being stolen. Therefore, it is desirable that the two parts be connected together by a chain or cable, a cable 23 being specifically shown, FIGS. 1 and 2. While, of course, the cable could be severed by pliers, or other cutting instruments, it has been found that normally an individual will not go to all that trouble. The cable 23 may be secured at one end by a lock clip engaging a leg 4, and the other end by threading it through the cylindrical receptacle near the bottom thereof, and then locked together by a securing device, FIGS. 1 and 2. However, in order to prevent the entire device from being slipped out of the ground, the cemetery vase unit of the invention comprises locking means 24, FIGS. 7 and 8, which may be of any type suitable for the purpose, but which is shown herein specifically as constituting a pair of opposed, relatively semi-circular plates 25. The plates normally lie within the confines of the receptacle 3, as shown in full lines in FIG. 8, but are less than a full semi-circle, the edges 26, 26 being spaced apart to provide a space 27 therebetween whereby a bar or tool may be arranged in the space 27 and then spread outwardly to cause the sections 25, 25 to assume the position shown in dotted lines in FIG. 8. Therefore, it would be a considerable task to cause the semi-circular members or wings 25 to again be spread inwardly within the confines of the hollow lower receptacle 3. However, in such cases where a grave may be changed, or the unit is to be removed to a different location, the members 25 could be forced inwardly to permit such removal. Each member 25 may be provided with a circular opening 28 to permit a pointed object to be inserted therein and then pounded or pushed inwardly so that the parts will again assume the position shown in full lines in FIG. 8. Each relatively semi-circular part 25 is pivotally connected at opposed corners by a pivot pin 29.

The vase may be made of any material suitable for the purpose, but is preferably made of metal such as bronze.

The cemetery vase unit of the invention embodies a hollow cylindrical base receptacle having slots formed at its upper end for the reception of legs for maintaining the vase in normal operating position and which receives the vase when the vase is inverted to hold the vase in its normal inoperative position, the vase being nested within the cylindrical receptacle. The legs on the vase and the slots on the receptacle are such as to hold normally the vase and the flowers which it is adapted to carry in normal upright position, but still will allow the vase to be tipped and fall on the ground when struck a blow such as by being hit by a lawn mower. The radial curvature of the flange on the receptacle, and the curvature of the flange on the vase, are such as to permit a lawn mower to pass freely over the device when the device is in the position shown in FIG. 3, without the blades or any part of the lawn mower coming in contact with the knob 21.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A cemetery vase unit embodying a vase and a lower receptacle to support the vase in a position projecting upwardly out of the receptacle or to support the vase within the receptacle in an inverted position in either of said positions comprising; an outwardly radially bowed annular flange surrounding the receptacle, said receptacle having at least three notches on its inner surface, legs on the vase receivable in said notches and supporting the vase in vertical position on the receptacle at the top thereof, and a radially bowed closure surface on the vase integral with said legs; the fit of said legs and said notches being such that they normally maintain the vase in flower-holding position and prevent the vase from being tipped easily by wind pressure but such that the vase may be tipped from supporting position on the receptacle when the vase is hit violently by an article such as a lawn mower.

2. The cemetery vase unit as defined in claim 1, and anchor means on the bottom of the receptacle and movable outwardly into ground engaging position to prevent the unit from being removed from the ground, said last named means comprising pivotally mounted coplanar relatively semi-circular plates having their inner edges spaced apart for engagement by a bladed tool inserted between said inner edges for movement outwardly of said receptacle, said plates extending substantially perpendicular to the upright axis of the receptacle.

References Cited in the file of this patent

UNITED STATES PATENTS

| | | |
|---|---|---|
| 1,152,286 | Brownson | Aug. 31, 1915 |
| 1,973,102 | Reep | Sept. 11, 1934 |
| 2,311,568 | Parkinson | Feb. 16, 1943 |
| 2,436,631 | Cohn | Feb. 24, 1948 |
| 2,610,443 | Carlson | Sept. 16, 1952 |
| 2,676,434 | Carlson | Apr. 27, 1954 |
| 2,754,625 | Rasmussen | July 17, 1956 |
| 2,774,186 | Wilkins | Dec. 18, 1956 |
| 2,881,591 | Reeve | Apr. 14, 1959 |